(12) United States Patent
Skårbratt et al.

(10) Patent No.: US 12,197,985 B2
(45) Date of Patent: Jan. 14, 2025

(54) INTEGRATED BIOMETRIC SENSOR MODULE AND METHOD FOR MANUFACTURING A SMARTCARD COMPRISING AN INTEGRATED BIOMETRIC SENSOR MODULE

(71) Applicant: FINGERPRINT CARDS ANACATUM IP AB, Gothenburg (SE)

(72) Inventors: Hanna Skårbratt, Gothenburg (SE); Zhecheng Shao, Gothenburg (SE); Mats Slottner, Lerum (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/246,347

(22) PCT Filed: Oct. 29, 2021

(86) PCT No.: PCT/SE2021/051085
§ 371 (c)(1),
(2) Date: Mar. 23, 2023

(87) PCT Pub. No.: WO2022/098276
PCT Pub. Date: May 12, 2022

(65) Prior Publication Data
US 2023/0359853 A1 Nov. 9, 2023

(30) Foreign Application Priority Data
Nov. 6, 2020 (SE) .................... 2051294-3

(51) Int. Cl.
*G06K 19/073* (2006.01)
(52) U.S. Cl.
CPC ............................ *G06K 19/07354* (2013.01)

(58) Field of Classification Search
CPC ............. G06K 19/07354; G06K 19/07; G06K 19/067; G06K 19/00; G06Q 20/34; G06Q 20/341
(Continued)

(56) References Cited

U.S. PATENT DOCUMENTS 9,152,841 B1  10/2015  Riedijk
9,501,733 B2  11/2016  Ayala et al.
(Continued)

FOREIGN PATENT DOCUMENTS

CN  110785764 A  2/2020
EP  3123395 A1  2/2017
(Continued)

OTHER PUBLICATIONS

International Search Report and Written Opinion for International Application No. PCT/SE2021/051085, dated Jan. 18, 2022.
(Continued)

*Primary Examiner* — Edwyn Labaze
(74) *Attorney, Agent, or Firm* — Westman, Champlin & Koehler, P.A.

(57) ABSTRACT

A smartcard comprising: a plurality of smartcard substrate layers; an antenna layer comprising an antenna; a fingerprint sensor module embedded in the smartcard and connected to the antenna layer, the fingerprint sensor module being configured to receive energy and communicate with a reading device via the antenna, and wherein the fingerprint sensor module is galvanically isolated from an outside of the smartcard.

16 Claims, 5 Drawing Sheets

(58) Field of Classification Search
 USPC ................................. 235/492, 380, 487, 375
 See application file for complete search history.

(56) References Cited

U.S. PATENT DOCUMENTS

| | | | |
|---|---|---|---|
| 9,780,062 B2 | 10/2017 | Ayala et al. | |
| 10,395,164 B2 | 8/2019 | Lundberg et al. | |
| 10,769,405 B2 | 9/2020 | Pompeani et al. | |
| 11,295,189 B2 | 4/2022 | Lundahl et al. | |
| 2005/0129685 A1* | 6/2005 | Cao | C07K 14/7155 424/143.1 |
| 2015/0310248 A1 | 10/2015 | Riedijk | |
| 2016/0026910 A1 | 1/2016 | Ayala et al. | |
| 2017/0005066 A1 | 1/2017 | Ayala et al. | |
| 2017/0076130 A1* | 3/2017 | Kravets | G06V 40/1306 |
| 2017/0116505 A1* | 4/2017 | Suwald | G06K 19/077 |
| 2017/0277936 A1 | 9/2017 | Slottner | |
| 2018/0174018 A1 | 6/2018 | Lundberg et al. | |
| 2018/0276519 A1* | 9/2018 | Benkley, III | G06F 21/45 |
| 2019/0005372 A1* | 1/2019 | Virostek | G06K 19/07771 |
| 2020/0051061 A1* | 2/2020 | Gandolfo | G07F 7/084 |
| 2020/0184173 A1 | 6/2020 | Jiang et al. | |
| 2021/0117743 A1* | 4/2021 | Pueschner | G06K 19/07775 |
| 2021/0133529 A1 | 5/2021 | Yeap et al. | |
| 2021/0224626 A1 | 7/2021 | Lundahl et al. | |
| 2022/0188395 A1* | 6/2022 | Bienfait | H04W 4/80 |
| 2022/0407566 A1* | 12/2022 | Diaz | H03H 7/383 |

FOREIGN PATENT DOCUMENTS

| | | | |
|---|---|---|---|
| EP | 3336759 A1 | 6/2018 | |
| WO | WO-2011141232 A1 * | 11/2011 | ............. B42D 25/00 |
| WO | 2014008937 A1 | 1/2014 | |
| WO | 2015147727 A1 | 10/2015 | |
| WO | 2018158644 A1 | 9/2018 | |
| WO | 2019004905 A1 | 1/2019 | |
| WO | 2019235989 A1 | 12/2019 | |

OTHER PUBLICATIONS

Extended European Search Report dated May 6, 2022, for corresponding European Application No. 21205477.9, 12 pages.
Swedish Search Report dated Jul. 16, 2021, for corresponding Swedish Application No. 2051294-3, 2 pages.

* cited by examiner

INTEGRATED BIOMETRIC SENSOR MODULE AND METHOD FOR MANUFACTURING A SMARTCARD COMPRISING AN INTEGRATED BIOMETRIC SENSOR MODULE

CROSS-REFERENCE TO RELATED APPLICATION

This Application is a Section 371 National Stage Application of International Application No. PCT/SE2021/051085, filed Oct. 29, 2021, which claims priority to Swedish Patent Application No. 2051294-3 filed on Nov. 6, 2020, and published as WO 2022/098276 A1 on May 12, 2022, in English, the entire contents of which are hereby incorporated by reference in their entireties.

FIELD OF THE INVENTION

The present invention relates to an integrated biometric sensor module. In particular, the invention relates to a smartcard comprising an integrated biometric sensor module and a method for manufacturing a smartcard comprising a biometric sensor module.

BACKGROUND OF THE INVENTION

As the development of biometric devices for identity verification, and in particular of fingerprint sensing devices, has led to devices which are made smaller, cheaper and more energy efficient, the range of applications for such devices is increasing.

In particular fingerprint sensing has been adopted more and more in, for example, consumer electronic devices, due to small form factor, relatively beneficial cost/performance factor and high user acceptance.

Capacitive fingerprint sensing devices, built based on CMOS technology for providing the fingerprint sensing elements and auxiliary logic circuitry, are increasingly popular as such sensing devices can be made both small and energy efficient while being able to identify a fingerprint with high accuracy. Thereby, capacitive fingerprint sensors are advantageously used for consumer electronics, such as portable computers, tablets and mobile phones. There is also an increasing interest in using fingerprint sensors in smartcards to enable biometric identification in a card such as a bank card where other types of biometric systems are not applicable.

Fingerprint sensors can be included in a smartcard by adding them after a smartcard has been produced, by a so-called mill and drill process and surface mounting the sensor module into the hole created in the surface of the card. This requires the fabrication of robust fingerprint sensors that are prepared for the wear and tear of being exposed at the surface of a smartcard.

However, it is still desirable to explore additional methods for integrating a biometric sensor in a smartcard, in particular in terms of cost reduction which is in part linked to the complexity of the manufacturing process.

SUMMARY

In view of above-mentioned and other drawbacks of the prior art, it is an object of the present invention to provide an improved smartcard and method for manufacturing a smartcard comprising a fingerprint sensor module.

According to a first aspect of the invention, there is provided a smartcard comprising: a plurality of smartcard substrate layers; an antenna layer comprising an antenna; a fingerprint sensor module embedded in the smartcard and connected to the antenna layer, the fingerprint sensor module being configured to receive energy and communicate with a reading device via the antenna, and wherein the fingerprint sensor module is galvanically isolated from an outside of the smartcard.

A smartcard can be considered to be any card comprising functionality such as biometric sensing, and smartcards may be used as payment cards, identification cards, access cards and in other applications where a card with built-in functionality is desirable. In the present context, the smartcard comprises a fingerprint sensor module connected to an antenna, but this does not exclude that other features are included in the smartcard. Moreover, even though the present description is aimed at a smartcard, the embedded and galvanically isolated fingerprint sensor module may also be implemented in other applications, such as a dongle, a key fob or the like.

The present invention is based on the realization that it is advantageous to provide a smartcard where the fingerprint sensor module is galvanically isolated within the smart card. The present invention thereby describes a solution for how to form a smartcard comprising a galvanically isolated fingerprint sensor module.

By embedding the fingerprint sensor module, greater mechanical and electrical protection for the electronics in the sensor module is provided. The production of the smartcard is also simplified by connecting the sensor module directly to the antenna that powers the smartcard. Thereby, even if the user holds a large electrical charge, there will be no path for the charge to damage neither the fingerprint sensor nor any other electronic component in the card or a payment terminal with which the car is in contact.

The invention is enabled by a fingerprint sensor which is capable of operating without an electrical connection to the user, and thereby without a bezel or any other external electrode. Such a fingerprint sensor without a bezel is described in EP3123395.

The fingerprint sensor module comprises at least a fingerprint sensor having an active sensing surface, and the fingerprint sensor may advantageously be a capacitive fingerprint sensor comprising an array of electrically conductive sensing elements. A capacitive fingerprint sensor should be understood to further comprise sensing circuitry connected to sensing elements for reading a signal from the sensing elements. The sensing circuitry may in turn comprise or be connected to readout circuitry for providing a result of the sensing device to an external device for further processing, which in the present case may be included in the fingerprint sensor module. The fingerprint sensor module may also comprise additional passive or active components.

The smartcard can be considered to be formed as a laminate structure comprising a plurality of layers, such as one or more core layers and outer layers on respective sides of the core layer(s). Typically, the smartcard will also comprise one or more electrically conductive layers embedded in the card to route signals between different parts of the card and/or to function as an antenna for power harvesting and communication.

According to one embodiment of the invention, the fingerprint sensor module may comprise contact pads on a backside of the module opposite a sensing side of the module, and wherein the contact pads are directly connected to the antenna. That the contact pads of the fingerprint sensor module are in direct contact, i.e. mechanical and physical contact, with the antenna both ensures a good electrical connection and simplifies manufacturing since no additional communication paths are required in the card.

According to one embodiment of the invention the fingerprint sensor module is a T-shaped module comprising contact pads on an extending portion of the module, the contact pads facing in the same direction as a sensing side of the module, and wherein the contact pads are directly connected to the antenna. The extending portion of the T-shaped module, sometimes referred to as wings, enables the arrangement of contact pads facing in the same direction as a sensing surface of the module, which may be advantageous in some implementations. The T-shaped module may be arranged as an inverted T, i.e. an upside-down T-shape where the sensing surface of the sensor module is facing upwards.

According to one embodiment of the invention, the antenna layer is located in the middle of the smartcard, and the fingerprint sensor module is located on one side of the antenna layer. From a mechanical stability/warpage standpoint it is preferable that the stacking of the layers in the card is as symmetrical as possible, so there is a preference of having two core layers on either side of the antenna layer which default places the antenna near the center of the card.

According to one embodiment of the invention, the fingerprint sensor module is laminated into the smartcard. The fingerprint sensor module can thereby be entirely embedded into the card and galvanically isolated using a process which is already in common use when manufacturing cards, thereby facilitating the implementation of a smartcard comprising a fingerprint sensor module.

According to one embodiment of the invention, the fingerprint sensor module comprises at least one of a secure element and a processing unit. Since the fingerprint sensor module is provided as a single module to be integrated in the smartcard, it can be advantageous to include additional components required for biometric identification and verification into the module in order to avoid having to integrate such components in the card using separate processing steps. The component may for example be a secure element, which in itself often comprises a processing unit, or a separate processing unit used in the fingerprint acquisition and verification process.

According to one embodiment of the invention smartcard comprises, in a direction from the antenna layer to an outer surface, at least one core layer, a printing layer and an outer layer, and wherein the fingerprint sensor module is arranged in an opening of the at least one core layer such that a top surface of the fingerprint sensor module is in line with a top surface of the core layer. By arranging the printing layer above the fingerprint sensor module, it is possible to provide a desirable visual appearance of the card. The printing layer may for example comprise a visual indication of the location of the active sensing area of the fingerprint sensor.

According to one embodiment of the invention, the smartcard comprises, in a direction from the antenna layer to an outer surface, at least one core layer, a printing layer and an outer layer, and wherein the fingerprint sensor module is arranged in an opening of the at least one core layer and the printing layer such that a top surface of the fingerprint sensor module is in line with a top surface of the printing layer. In some implementations it is desirable to minimize the distance between the fingerprint sensor and the card surface and this can be achieved by forming an opening on both a core layer and a printing layer so that the fingerprint sensor is only covered by an outer layer of the card. By minimizing the distance between a sensing surface and a finger, fingerprint acquisition also under more difficult conditions is facilitated.

According to one embodiment of the invention, there is provided a fingerprint sensor assembly comprising: a fingerprint sensor module comprising contact pads for contacting an antenna, wherein the contact pads are located on a side of the fingerprint sensor module opposite a sensing surface of the module; and an antenna film comprising a conductive antenna embedded in an insulating coating arranged on an antenna carrier, wherein the antenna film is attached to the fingerprint sensor module, the antenna carrier comprises openings corresponding to and aligned with corresponding contact pads of the fingerprint sensor module, and wherein there is no insulating coating of the antenna at locations of the contact pads such that a mechanical and electrical connection is formed between the conductive antenna and the contact pads. The described fingerprint sensor assembly can be seen as an assembly suitable and ready for integration in a smartcard, where the antenna layer has been attached to the fingerprint sensor module and where the antenna as such is electrically connected to contact pads of the fingerprint sensor module. However, the described fingerprint sensor assembly may also be adapted for integration in other components such as a dongle or key fob where an embedded fingerprint sensor module is desirable. The fingerprint sensor assembly may also be embedded and provided as a stand-alone module for integration in other systems requiring biometric identification.

In known smartcard manufacturing processes, the antenna is often provided in the form of an antenna film comprising a conductive wire arranged in a desired pattern. Due to the very low thickness of the antenna, it is arranged on an antenna carrier layer which is a plastic material, and the antenna is also embedded in an insulating coating to enable antenna crossings without causing a short circuit. By forming openings in the antenna carrier, it is possible to access the antenna with a heated tool in order to melt the insulating layer at the location of the contact pads to form an electrical contact between the antenna and the contact pad. Without the openings in the antenna film, it would not be possible to melt only the insulating coating since the antenna film would be melted as well, potentially damaging the tool.

According to a second aspect of the invention, there is provided a method for manufacturing a smartcard comprising: providing a fingerprint sensor module comprising contact pads for contacting an antenna; providing an antenna film comprising a conductive antenna embedded in an insulating coating arranged on an antenna carrier; forming openings in the antenna carrier in locations corresponding to the contact pads of the fingerprint sensor module; arranging the antenna film on the fingerprint sensor module such that the openings are aligned with the contact pads and such that the conductive antenna is facing the contact pads; through the openings in the antenna carrier, contacting the conductive antenna with a heated tool to melt the insulating coating at the locations of the contact pads, thereby forming an electrical contact between the conductive antenna and the contact pads; and embedding the antenna film and the fingerprint sensor module with additional smartcard layers to form a laminated smartcard.

By means of the described method, a smartcard comprising a fingerprint sensor module can be made using conventional card manufacturing steps where different sheets of plastic material are laminated together to form the final card. The fingerprint sensor module is thus attached to the antenna film and suitable openings are formed in adjacent layers to house the sensor module, and the antenna film comprising the fingerprint sensor module can be easily integrated in the card manufacturing process.

According to one embodiment of the invention, the method comprises performing hot lamination using a laminating plate having a protruding portion at a position corresponding to a location of the fingerprint sensor module such that an indentation is formed in the smartcard surface at the location of a sensing area of the fingerprint sensor module. There are several benefits in forming an indentation at the card surface. One advantage is that a tactile feel is added to improve the accuracy of finger placement during imaging, and another advantage is that the amount of material directly over the sensor is reduced to increase the capacitive coupling between a finger and the fingerprint sensor to improve the imaging signal.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the smartcard and method for manufacturing a smartcard according to the present invention are mainly described with reference to a smartcard comprising a capacitive fingerprint sensor embedded therein.

Figure 1:
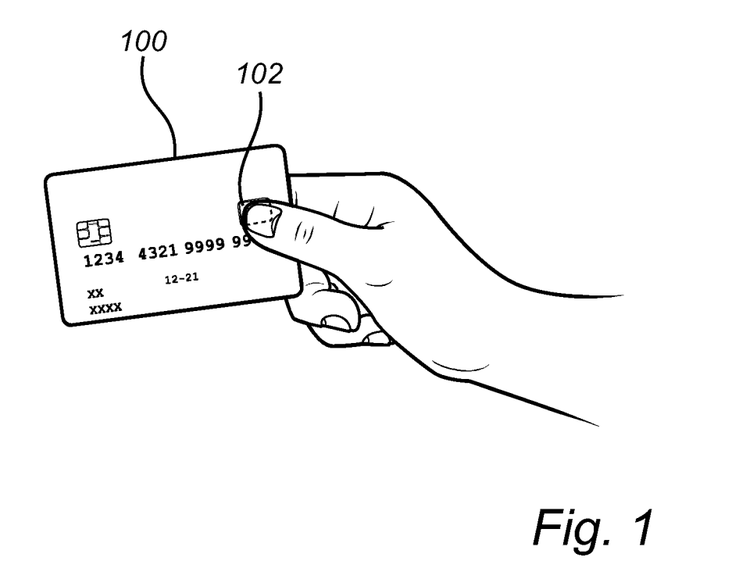
FIG. 1 schematically illustrates a smartcard comprising a fingerprint sensor module according to an embodiment of the invention.

FIG. 1 schematically illustrates a smart card 100 comprising a fingerprint sensor module 102 according to an embodiment of the invention.

Figure 2:
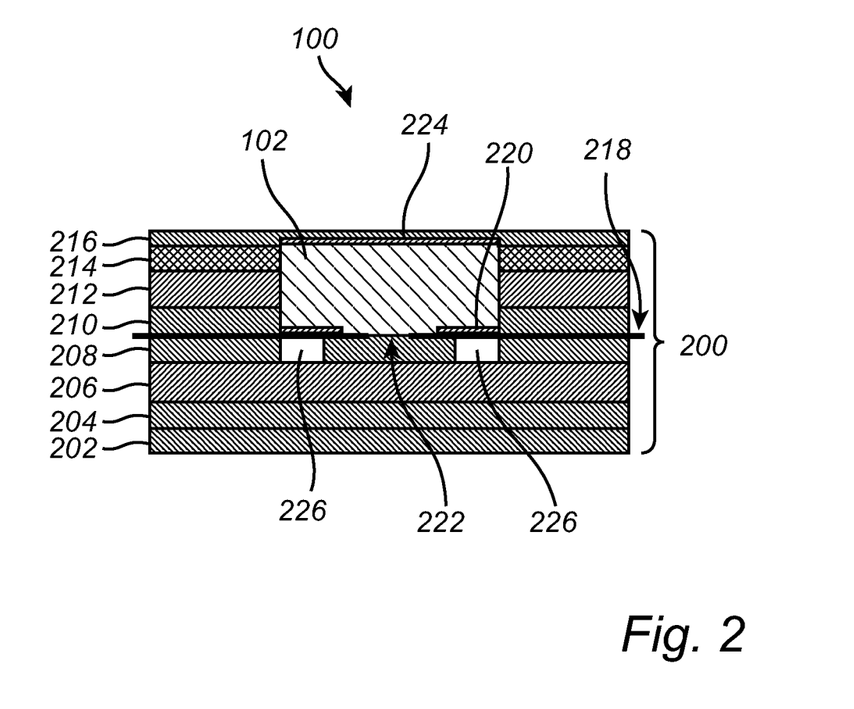
FIG. 2 schematically illustrates a portion of a smartcard according to an embodiment of the invention.

FIG. 2 is a schematic cross section illustration of a smartcard 100 according to an embodiment of the invention. The smartcard comprises a plurality of smartcard substrate layers 200, one of which is an antenna layer 208 comprising an antenna 218. A smartcard may comprise a large number of layers, e.g. some layers referred to as core layers or foils and some referred to as overlay layers or foils. Overlay foils are typically thinner and transparent while the core foils are of a solid color, often white, and thicker. The overlay foils are typically the outer layer on both the top and bottom of the card and are designed to have a glossy or matte finish depending on the aesthetic requirements on the card. The core foil gives the physical structure and weight of the card. The number of foils that are used depend on what features are needed on the card. For example, in addition to the core foil and overlay foil you can have a "signature panel foil", a magnetic stripe foil", "security overlay foil". Several overlay foils can also be stacked together to create the desired thickness of the total card.

In the illustrated example, the smartcard 100 comprises, from the bottom, two overlay layers, 202, 204, a core layer 206, an antenna layer 208, an overlay layer, 210, a core layer 212, a printing layer 214 and finally an overlay layer 216 forming the upper surface of the smartcard 100.

The smartcard 100 further comprises a fingerprint sensor module 102 embedded in the smartcard and connected to the antenna 218 in the antenna layer 208, the fingerprint sensor module 102 being configured to receive energy and communicate with a reading device via the antenna 218. Moreover, the fingerprint sensor module 102 is galvanically isolated from an outside of the smartcard, i.e. the fingerprint sensor module and any associated components such as the antenna 218 are fully embedded in the smartcard so that there is no conductive path from the fingerprint sensor module 102 to the outside of the card.

As further illustrated in FIG. 2, the fingerprint sensor module 100 comprises contact pads 220 on a backside of the module 100 opposite a sensing side 224 of the module, and wherein the contact pads 220 are directly connected to the antenna 218. The direct connection between the fingerprint sensor module 102 and the antenna 218 simplifies the manufacturing process and also ensures that there is a reliable electric connection between sensor module 102 and the antenna 218.

FIG. 2 also illustrate openings 226 in the antenna film 208 at the locations of the contact pads 220. The antenna film 208 comprises an antenna carrier in the form of a plastic material and the antenna 218 itself. The openings 226 are formed in order to be able to access the antenna with a heated tool during manufacturing as will be described in further detail when describing the manufacturing process. However, in the final card the lamination process will have melted the plastic so that the openings are partially or fully filled by surrounding melted plastic material. The openings 226 in FIG. 2 are thus provided for illustrative purposes and should not be taken to be an exact representation of a final smartcard. However, the direct connection between the contact pads 220 and the antenna 218 will still exist in the final smartcard and could be seen in a cross section of a card.

Figure 3:
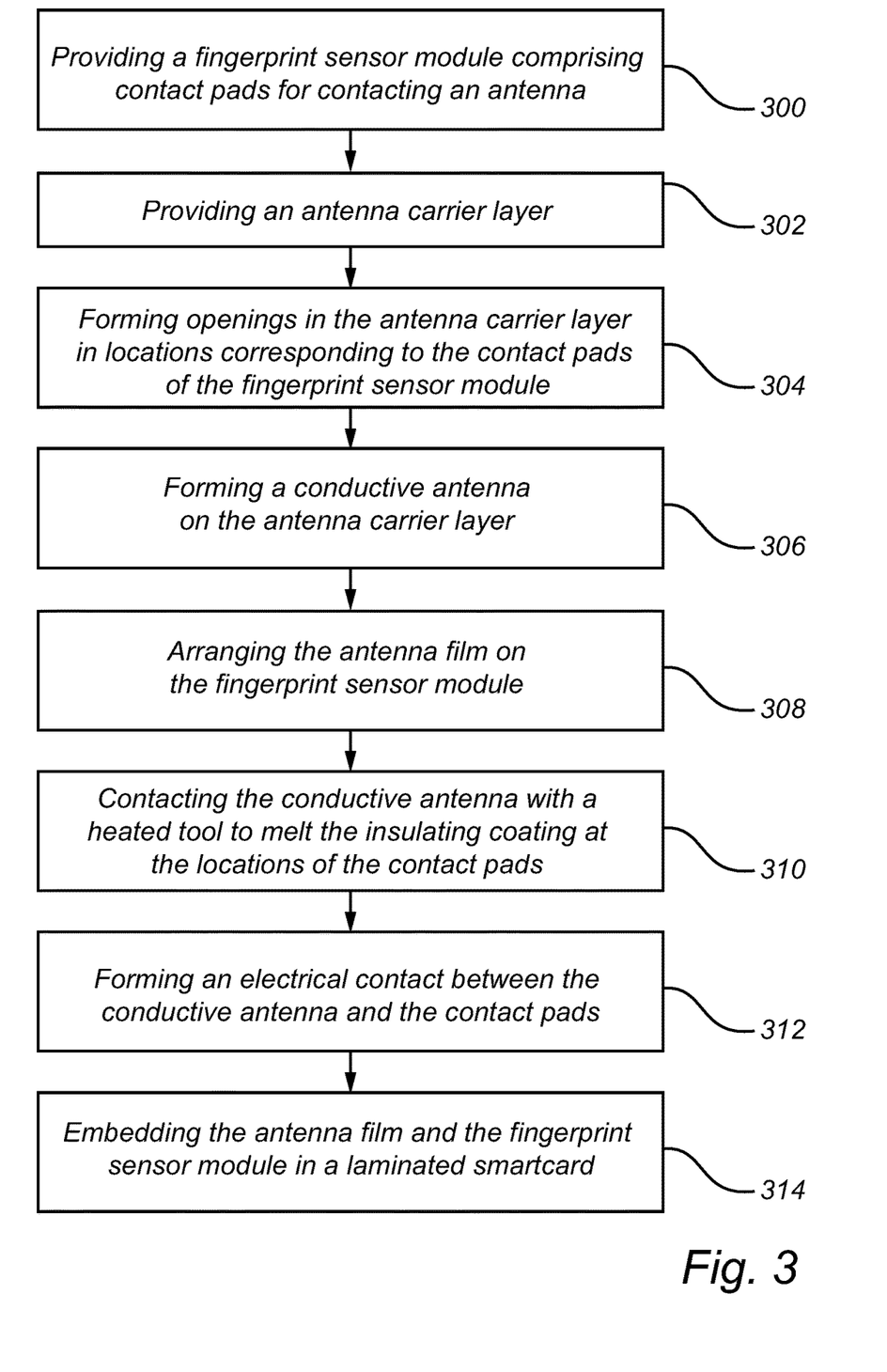
FIG. 3 is a flow chart outlining the general steps of a method according to an embodiment of the invention.

FIG. 3 is a flow chart outlining steps of a method of manufacturing a smartcard 100 according to an embodiment of the invention and FIGS. 4A-D illustrate selected steps of the method. In particular, FIGS. 4A-D highlight the steps related to the contact formation between the antenna and the contact pads of the fingerprint sensor module 100. The general steps of forming a smartcard using various plastic foils and hot lamination can be assumed to be well known to the skilled person and will therefore not be detailed herein.

Figure 4A:
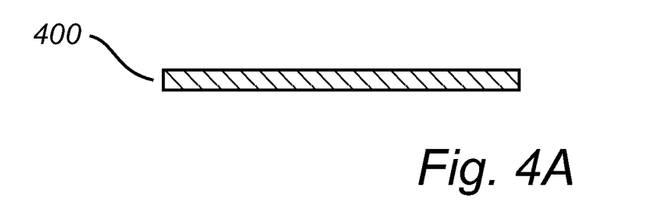
FIG. 4 schematically illustrates selected steps of a method of manufacturing a smartcard according to an embodiment of the invention.

First, a fingerprint sensor module 102 comprising contact pads 220 for contacting an antenna is provided 300, followed by providing 302 an antenna carrier layer 400 illustrated in FIG. 4A.

Figure 4B:
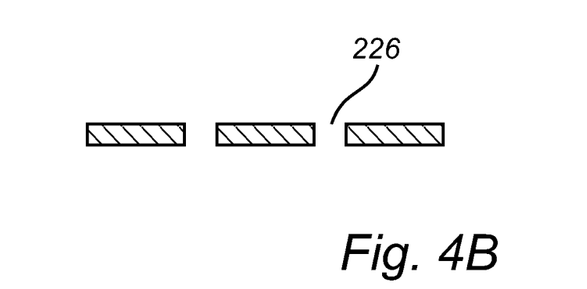

Next, openings 226 are formed 304 in the antenna carrier layer 400 in locations corresponding to the contact pads 220 of the fingerprint sensor module as illustrated in FIG. 4B.

Figure 4C:
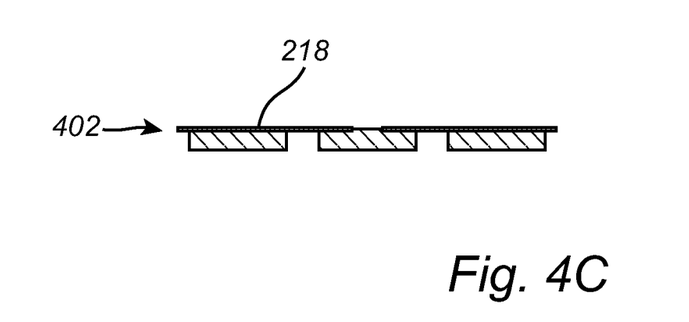

FIG. 4C illustrates forming 306 the conductive antenna 218 on the antenna carrier layer to form a complete antenna film 402. The conductive antenna comprises a copper wire being arranged on the antenna carrier according to a predetermined pattern, e.g. from a CAD template. The antenna 218, i.e. the copper wire, is embedded in an insulating coating in order to allow antenna crossings without short-circuiting the antenna.

Figure 4D:
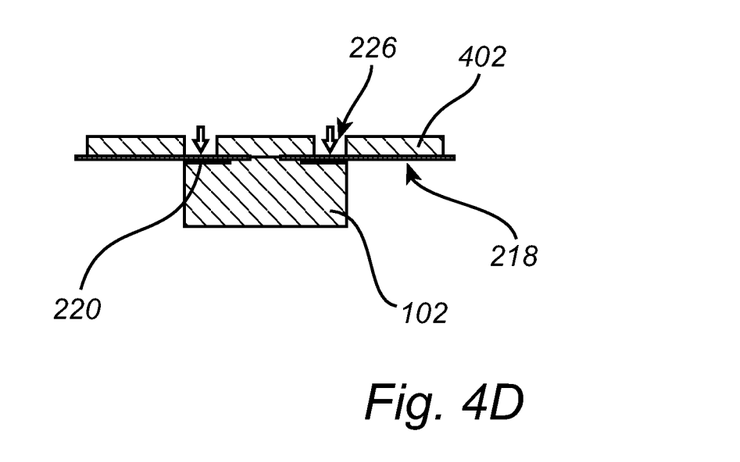

Once the antenna film 402 is completed with the patterned antenna, it is being flipped upside down and arranged 308 on the fingerprint sensor module 102 which is placed having the contact pads 220 facing upward as illustrated in FIG. 4D. The openings 226 are aligned with the contact pads 220 so that the antenna 218 is facing the contact pads 220 and also overlaps the contact pads 220.

In the next step, the conductive antenna 218 is contacted with a heated tool through the openings in the antenna carrier layer 400 in order to melt the insulating coating at the locations of the contact pads 220, thereby forming 312 an electrical contact between the conductive antenna 218 and the contact pads 220. The heating tool may for example be a hot welding tip or the like which can access the exposed antenna 218 through the opening 26. When the insulating coating is melted, a direct physical contact is formed between the conductive antenna 218 and the contact pad, thereby forming a good electrical connection.

Finally, the antenna film and the fingerprint sensor module are embedded 314 in a smartcard through lamination. Lamination may be performed in the form of hot lamination where a stack of layers together forms a body of the smartcard 100.

Figure 5:
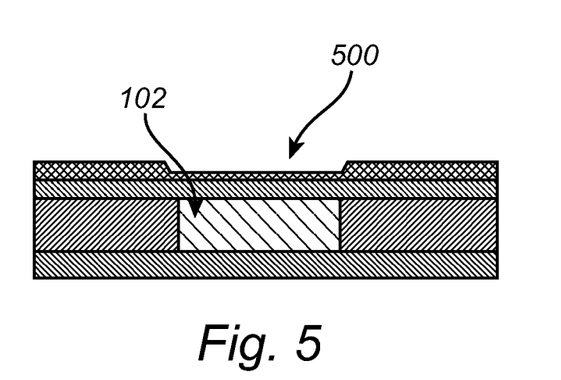
FIG. 5 schematically illustrates a portion of a smartcard according to an embodiment of the invention.

The lamination process may also comprise using a laminating plate having a protruding portion at a position corresponding to a location of the fingerprint sensor module. This will have the effect that an indentation 500 is formed in the smartcard surface at the location of a sensing area of the fingerprint sensor module 102 as illustrated in FIG. 5. The indentation is advantageous in that it will guide the user to a correct finger placement on the smartcard. Moreover, the indentation will act to protect the outer surface of the smartcard from scratches and the like at the location of the sensor.

Figure 6:
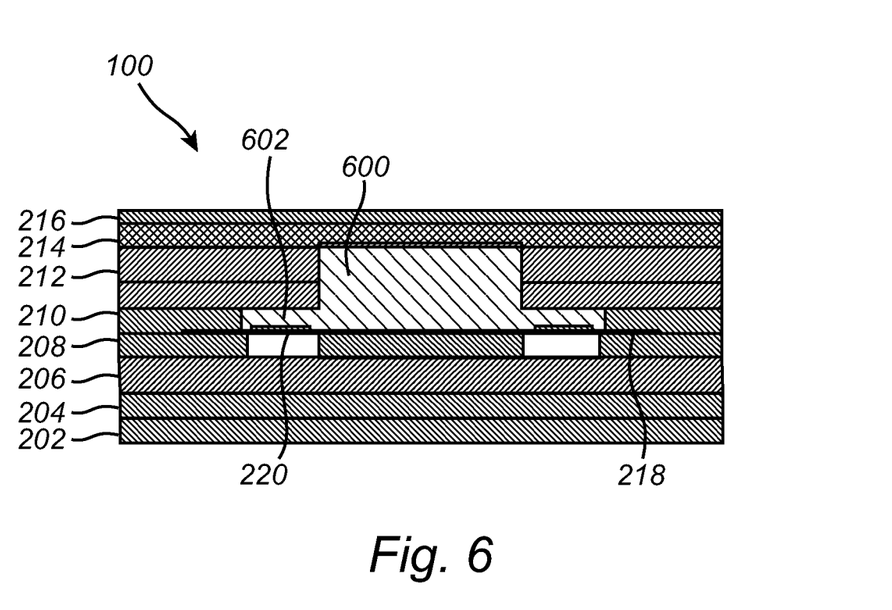
FIG. 6 schematically illustrates a portion of a smartcard according to an embodiment of the invention.

FIG. 6 schematically illustrate an example embodiment of a portion of a smartcard 100 where the fingerprint sensor module 600 comprises wings 602, making the cross section of the fingerprint sensor module 600 T-shaped, here seen as an upside-down T. The contact pads 220 for connecting to the antenna 218 are located on a backside of the sensor module same as in the previously described embodiments. Accordingly, the described configuration of a smartcard is applicable for different designs of the fingerprint sensor module.

Figure 7:
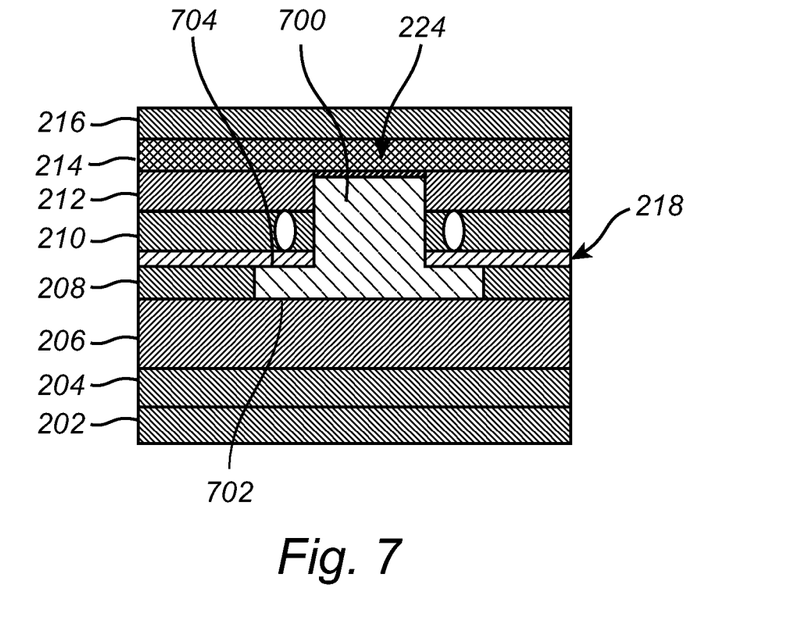
FIG. 7 schematically illustrates a portion of a smartcard according to an embodiment of the invention.

FIG. 7 schematically illustrate an example embodiment of a portion of a smartcard 100 where the fingerprint sensor module 700 again comprises wings 702, but where the contact pads 704 are located on a top side of the wings 702 such that the contact pads 704 face in the same direction as a sensing surface 224 of the fingerprint sensor module 700. The illustrated embodiment may be advantageous in implementations where it is desirable to place the sensor with the sensing side up during the welding step, and/or if it is desirable to have the antenna closer to the surface of the card.

It would also be possible to arrange the contact pads of the fingerprint sensor module on the side of the module, either directly on the side of the module or on the side of wings of a T-shaped module. Side facing contact pads can for example be made using a so-called castellation process.

In the above description, the fingerprint sensor module is described as a single module. However, the module may comprise additional components such as a secure element (SE) and/or one or more additional active or passive components, such as a processing unit. Moreover, it is also possible to arrange one or more of the secure element and processing unit outside of the fingerprint sensor module itself, and to connect the component to the fingerprint sensor module using wiring in the smartcard. It should be noted that the fingerprint sensor module would still be galvanically isolated from an outside of the car since none of the components connected to the module have an external interface.

Even though the invention has been described with reference to specific exemplifying embodiments thereof, many different alterations, modifications and the like will become apparent for those skilled in the art. Also, it should be noted that parts of the method may be omitted, interchanged or arranged in various ways, the method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A smartcard comprising:
   a plurality of smartcard substrate layers;
   an antenna layer comprising an antenna;
   a fingerprint sensor module embedded in the smartcard and connected to the antenna layer, the fingerprint sensor module being configured to receive energy and communicate with a reading device via the antenna, and wherein the fingerprint sensor module is galvanically isolated from an outside of the smartcard.

2. The smartcard according to claim 1, wherein the fingerprint sensor module comprises contact pads on a backside of the module opposite a sensing side of the module, and wherein the contact pads are directly connected to the antenna.

3. The smartcard according to claim 1, wherein the fingerprint sensor module is a T-shaped module comprising contact pads on an extending portion of the module, the contact pads facing in the same direction as a sensing side of the module, and wherein the contact pads are directly connected to the antenna.

4. The smartcard according to claim 2, wherein the contact pads are in physical contact with a conducting wire of the antenna.

5. The smartcard according to claim 1, wherein the antenna layer is located in the middle of the smartcard, and wherein the fingerprint sensor module is located on one side of the antenna layer.

6. The smartcard according to claim 1, wherein the fingerprint sensor module is laminated into the smartcard.

7. The smartcard according to claim 1, wherein the fingerprint sensor module comprises at least one of a secure element and a processing unit.

8. The smartcard according to claim 1, wherein the smartcard comprises, in a direction from the antenna layer to an outer surface, at least one core layer, a printing layer and an outer layer, and wherein the fingerprint sensor module is arranged in an opening of the at least one core layer such that a top surface of the fingerprint sensor module is in line with a top surface of the core layer.

9. The smartcard according to claim 1, wherein the smartcard comprises, in a direction from the antenna layer to an outer surface, at least one core layer, a printing layer and an outer layer, and wherein the fingerprint sensor module is arranged in an opening of the at least one core layer and the printing layer such that a top surface of the fingerprint sensor module is in line with a top surface of the printing layer.

10. A fingerprint sensor assembly comprising:
a fingerprint sensor module comprising contact pads for contacting an antenna, wherein the contact pads are located on a side of the fingerprint sensor module opposite a sensing surface of the module; and
an antenna film comprising a conductive antenna embedded in an insulating coating arranged on an antenna carrier, wherein:
the antenna film is attached to the fingerprint sensor module,
the antenna carrier comprises openings corresponding to and aligned with corresponding contact pads of the fingerprint sensor module so that the antenna film is accessible through the openings when the antenna film is attached to the fingerprint sensor module, and
wherein there is no insulating coating of the antenna at locations of the contact pads such that a mechanical and electrical connection is formed between the conductive antenna and the contact pads.

11. Method for manufacturing a smartcard comprising:
providing a fingerprint sensor module comprising contact pads for contacting an antenna;
providing an antenna carrier layer;
forming openings in the antenna carrier layer in locations corresponding to the contact pads of the fingerprint sensor module;
forming a conductive antenna embedded in an insulating coating on the antenna carrier layer to form an antenna film;
arranging the antenna film on the fingerprint sensor module such that the openings are aligned with the contact pads and such that the conductive antenna is facing the contact pads;
through the openings in the antenna carrier layer, contacting the conductive antenna with a heated tool to melt the insulating coating at the locations of the contact pads, thereby forming an electrical contact between the conductive antenna and the contact pads; and
embedding the antenna film and the fingerprint sensor module with additional smartcard layers to form a laminated smartcard.

12. The method according to claim 11, wherein the step of contacting the conductive antenna with a heated tool comprises melting the insulating coating such that a physical contact is formed between the conductive antenna and the contact pads.

13. The method according to claim 11, wherein the heated tool is hot welding tip.

14. The method according to claim 11, wherein embedding the antenna film and the fingerprint sensor module in a laminated smartcard comprises performing hot lamination on a stack of layers forming a body of the smartcard.

15. The method according to claim 14, wherein performing hot lamination comprises using a laminating plate having a protruding portion at a position corresponding to a location of the fingerprint sensor module such that an indentation is formed in the smartcard surface at the location of a sensing area of the fingerprint sensor module.

16. The method according to claim 11, wherein embedding the antenna film and the fingerprint sensor module in a laminated smartcard further comprises:
forming an opening in a smartcard core layer; and
arranging the smartcard core layer on the antenna film such that the fingerprint sensor module is located in the opening of the smartcard core layer.

* * * * *